Patented Aug. 27, 1940

2,212,611

UNITED STATES PATENT OFFICE 2,212,611

ADHESIVE COMPOSITION AND METHOD OF PREPARING SAME

Alexander D. Macdonald, Malden, Mass., assignor to B. B. Chemical Co., Boston, Mass., a corporation of Massachusetts No Drawing. Application March 31, 1937, Serial No. 134,126

5 Claims. (Cl. 260—89)

This invention relates to polymerized chloroprene and more particularly to adhesive compositions prepared from plastic polymers of chloroprene.

Plastic polymerized chloroprene is chloroprene (also known as chloro-2-butadiene-1,3) which has been polymerized to such an extent that it may be worked on the rolls of a rubber mill and compounded with other ingredients in a manner similar to that in which crude rubber is treated. Such plastic polymerized chloroprene may be "cured" to a condition in which it resembles vulcanized rubber in exhibiting essentially elastic rather than plastic properties. This "curing" of plastic polymerized chloroprene, often spoken of as "vulcanization," appears to be a further polymerization of chloroprene, as distinguished from the vulcanization of rubber wherein sulphur is considered to be added to the rubber hydrocarbon.

The usual mode of employing plastic polymerized chloroprene as an adhesive medium is to form a colloidal solution thereof in a suitable solvent. This liquid adhesive composition is applied to each of two surfaces to be united, and the adhesive then permitted to dry until the deposited adhesive films are "tacky" or adhesive to each other. The parts to be united are then brought into juxtaposition and placed under attaching pressure. If the adhesive-coated parts are permitted to dry too long, the adhesive surfaces progressively lose their tack, with a corresponding decrease in the strength of bond obtained.

The use of relatively volatile solvent material in preparing the liquid adhesive compositions from plastic polymerized chloroprene is generally advantageous. One reason is that such compositions become tacky within a relatively short time after application to parts to be united, whereby, if desired, the attaching operation may take place relatively soon after the original application of the adhesive. Furthermore, only a very short time of application of attaching pressure is required. Moreover, after the attaching operation the bond between the adhesively joined parts rapidly gains its maximum strength, due probably to the fairly rapid dissipation of the small quantities of solvent remaining in the deposited adhesive material.

A disadvantage attending the use of relatively volatile solvent material is that the so-called tacky period is short, measured in hours. Thus, where a mixture of equal volumes of benzene and trichloroethylene is employed as the solvent for a cement wherein the sole adhesive material is plastic polymerized chloroprene, the adhesive-coated surfaces must be brought together under attaching pressure within about six hours, because after that period the strength of bond attainable is very greatly decreased. In the case of certain operations in shoe factories, for example outsole-attaching, the necessity of attaching leather outsoles within about six hours after the application of the adhesive means that the shoe parts which have been coated with adhesive must be attached the same working day. Consequently, limitations are imposed upon the working periods for these operations, that is to say, attaching operations cannot be commenced in the morning until shoe parts have been coated with adhesive and the adhesive has become tacky. Also, adhesive-applying operations must be stopped early enough in the afternoon so that all adhesive-coated parts may be in condition for attaching, and may be attached before the end of the working day.

Objects of this invention are to overcome difficulties outlined above by providing a polymerized chloroprene adhesive which will remain in tacky condition for at least an overnight period after application to parts to be united. Another object is to provide an advantageous method of preparing such a composition.

According to the present invention, the above and other objects are attained by incorporating zinc chloride double salt of phenyl hydrazine in a colloidal dispersion or solution of plastic polymerized chloroprene. In such composition the zinc chloride double salt of phenyl hydrazine, a material which may be obtained under the commercial name of "R. P. A. No. 1," is preferably present to the extent of about 1 to 5% by weight of the polymerized chloroprene.

The advantages of the invention are readily apparent when it is remarked that plastic polymerized chloroprene compositions containing such small percentages of zinc chloride double salt of phenyl hydrazine will remain adhesive to similar surfaces as much as 18 to 24 hours after application of the liquid adhesive. Moreover, such increased period of adhesiveness is accomplished without substantial reduction in the strength of the adhesive bond and without imparting thermoplastic characteristics to the adhesive.

The lengthening of the period of tackiness of the cement film to 18 to 24 hours while still permitting the use of relatively volatile solvents whereby the cement is in tacky condition within a relatively short period, for example ½ to 1 hour after application, is of tremendous advantage in factory production, for example in shoe factories wherein it makes possible the application of liquid adhesive to shoe parts, for example outsoles and shoe uppers, throughout the working day and the attaching of such parts on the following day. Since the application of liquid adhesive to various shoe parts and the placing of such parts in juxtaposition and under attaching pressure are frequently done in different departments, the increased flexibility in the scheduling of operations afforded by this invention will be obvious. Hitherto, it has been necessary to conform to fairly rigid scheduling of cementing and attaching operations in order that cemented parts might be attached within from 3 to 6 hours after the adhesive applying operation. Under such conditions cement applying operations were more or less confined to the morning of the working day and attaching operations were more or less confined to the late morning and afternoon of the working day. The present invention, however, makes it possible to carry out both cement applying and attaching operations throughout the working day and to attach in the forenoon parts to which adhesive has been applied in the afternoon of the previous day.

The composition may and preferably does contain additional modifying and compounding ingredients, and in accordance with another aspect of the invention I have provided an advantageous method of preparing the liquid adhesive composition. This is accomplished, where zinc oxide is to be present in the composition in addition to the zinc chloride double salt of phenyl hydrazine, by milling together part of the polymerized chloroprene with most or all of the zinc oxide and a major portion of the zinc chloride double salt of phenyl hydrazine. The remainder of the plastic polymer is milled with the balance of the zinc chloride double salt of phenyl hydrazine. Subsequently the separately milled batches are dispersed in the solvent material.

An example of a preferred composition in accordance with this invention is as follows:

| | Pounds |
|---|---|
| Malodorant-free plastic polymerized chloroprene | 90.7 |
| Zinc chloride double salt of phenyl hydrazine | 4.0 |
| Magnesium oxide (light) | 9.1 |
| Zinc oxide | 4.6 |
| Sulphur | 2.7 |
| Monoethanolamine | 3.0 |
| Diethylamine (88% solution in water) | 2.3 |
| Benzene (17 gallons) | 125.0 |
| Trichloroethylene (17 gallons) | 207.3 |

Yield, 35.6 gallons.

In the above composition it will be observed that the amount of zinc chloride double salt of phenyl hydrazine with respect to the polymerized chloroprene is 4.4% or, in other words, in the neighborhood of 5%.

The preparation of the above composition is preferably carried out by dividing the solid ingredients into two batches. In batch I are placed (in terms of weight) about one-half of the malodorant-free plastic polymer of chloroprene, three-quarters of the zinc chloride double salt of phenyl hydrazine, three-quarters of the magnesium oxide, all of the zinc oxide, and one-half of the monoethanolamine. In batch II are placed one-half of the polymerized chloroprene, one-quarter of the zinc chloride double salt of phenyl hydrazine, one-quarter of the magnesium oxide, and one-sixth of the monoethanolamine.

Illustrative compositions of batches I and II in numerical quantities by weight are as follows:

| | Batch I | Batch II |
|---|---|---|
| | Pounds | Pounds |
| Malodorant-free plastic polymerized chloroprene | 45.35 | 45.35 |
| Zinc chloride double salt of phenyl hydrazine | 3.0 | 1.0 |
| Magnesium oxide | 6.8 | 2.3 |
| Zinc oxide | 4.6 | |
| Monoethanolamine | 1.5 | 0.5 |

Batches I and II are milled separately at relatively low temperatures in an ordinary rubber mill. This is conveniently accomplished by water-cooling the rolls of the compounding mill sufficiently to keep the temperature of the ingredients below about 80° F. In the case of each batch, milling for a period of about 20 to 30 minutes is usually sufficient to compound the ingredients. Preferably the compounding is carried out by adding the ingredients to the plastic polymer in the order in which said materials are above listed. After the ingredients have been sufficiently milled the compounded material is sheeted out, for example to a thickness of $\frac{1}{16}$ inch to $\frac{1}{8}$ inch, and cut into small pieces of not more than a few inches square. The compounded material of the batches is now ready to be dispersed in the solvent to form a colloidal solution.

Certain distinct advantages arise by compounding the above ingredients with the deodorized plastic polymer in two batches in the manner described above. Thus, batch II is milled in the absence of zinc oxide and the plastic polymer of this batch is therefore not subjected to any scorching action by said zinc oxide, and the presence of the monoethanolamine and of the zinc chloride double salt of phenyl hydrazine in this batch tends to inhibit premature curing of the polymer. Furthermore, by milling zinc oxide in batch I with the larger quantities of magnesium oxide, zinc chloride double salt of phenyl hydrazine, and monoethanolamine, the protective effect of these ingredients results in inhibiting the scorching effect of the zinc oxide to an extent resulting ultimately in greater stability of the liquid adhesive composition.

The compounded material of the two batches is dispersed or colloidally dissolved in the solvent as soon as practicable after the compounding, and preferably the same day. To dissolve the above quantities of ingredients 34.0 gallons of solvent consisting of equal volumes of benzene and trichloroethylene may be placed in a water-jacketed and water-cooled churn and agitation commenced. The small pieces of compounded material from the above-described batches are added to the solvent as fast as previously added pieces are "wet out" by the solvent. The diethylamine and the balance of the monoethanolamine may be added to the solvent mixture in the churn. The sulphur is preferably added to the material in the churn when the dispersion or colloidal solution has become sufficiently viscous to support the sulphur in suspension. Thus, after all the compounded material has been added to the churn and agitated for about one-half hour, 2.7 pounds of sulphur are added. The churning is continued for about 6 to 8 hours. During the entire solution process the temperature of the liquid composition is preferably maintained below about 80° F. by the cooling water circulating in the jacket of the churn.

The optimum viscosity of the liquid adhesive will depend on the particular use to which it is put. For example, in attaching outsoles to shoe uppers, and where the adhesive is to be brushed onto the shoe parts by hand, I have found that the viscosity of the liquid adhesive solution should be within the range of from 15 to 30 seconds and preferably from 23 to 28 seconds. Where for such purpose the adhesive is to be applied by extrusion or other mechanical means the viscosity of the adhesive may be higher and up to, for example, 50 seconds. This viscosity refers to the number of seconds required for a steel ball of 9.5 mm. (⅜ inch) diameter and weighing from 3.45 to 3.55 grams to drop 40 cm. through a sample of the liquid adhesive maintained at 25° C. in a glass tube of 19 mm. inside diameter.

For the purpose of preparing a composition within the desired viscosity range, it is sometimes practicable to withhold a portion of the solvent used to disperse the solid constituents of the composition and then after a test of the viscosity to add sufficient solvent to reduce the viscosity to within the desired range.

Where slow curing of the malodorant-free plastic polymer of chloroprene is desired the composition as thus prepared may be used directly for adhesive purposes. If, however, a faster curing of the plastic polymer is desired, then a solution of an accelerator in a suitable solvent may be added to the liquid adhesive composition. The accelerator preferably is added not more than 24 hours prior to the actual use of the liquid composition for adhesive purposes (preferably the same working day) in order that premature curing may not take place. A satisfactory accelerator for this purpose is that known commercially as "du Pont Accelerator #808" and which is a butyraldehyde aniline condensation product. An accelerating solution suitable for the above-described adhesive comprises 1 part by volume Accelerator #808 dissolved in 9 parts benzene. A liquid ounce of this solution may be stirred into a quart of adhesive just prior to use.

In the above composition the malodorant-free polymerized chloroprene is of course the adhesive material. The magnesium oxide serves, at least in part, to neutralize any hydrochloric acid which may be set free in the polymerized chloroprene and also to prevent scorching when zinc oxide and polymerized chloroprene are milled together. The zinc oxide appears to assist in the later curing or more complete polymerization of the plastic polymer. The sulphur appears to assist in the later curing of the polymer. The benzene and the trichloroethylene function of course as solvents or dispersing media for the polymerized chloroprene and associated materials. The jointly present diethylamine and ethanolamine function as disclosed in my copending application Serial No. 117,902, filed December 28, 1936, (now Patent 2,163,611, issued June 27, 1939), to improve the stability and flowing properties of the liquid adhesive composition.

In carrying out the adhesion of leather or shoe parts by means of the liquid adhesive composition of this invention, the leather parts are preferably first roughed in a suitable manner, such as by an emery wheel or a wire brush, in order to provide surfaces most advantageous for cementing. The liquid adhesive is then applied preferably to both surfaces to be united. The application of the adhesive may be by brush, by extrusion, or in any other suitable manner. The applied composition is then permitted to dry for a sufficient length of time to remove a major portion of the solvent. At the time of the application of the adhesive to the leather the leather may be water-moistened or, as known in the art, in temper. However, where conditions permit, it is desirable, though not necessary, to have the leather in an air-dry condition. Ordinarily a drying time of not more than about one hour is necessary before the adhesive-coated parts may be brought together under attaching pressure. On the other hand, the adhesive may be permitted to dry for as much as 18 to 24 hours before bringing the adhesive-coated parts together without substantially affecting the strength of bond. After a suitable drying period as described above, the parts are brought together under attaching pressure, either momentarily or for a longer period. By way of example, in the adhesive attaching of outsoles to shoe bottoms, an attaching pressure of 80 pounds per square inch has been found satisfactory. Lower attaching pressures may be employed but preferably a relatively high attaching pressure is used.

It will be understood that in manufacturing the new adhesive of my invention other compounding ingredients for plastic polymerized chloroprene than those specifically disclosed may be used, and also other solvents for said plastic polymers, for example, toluene, xylene, carbon tetrachloride, etc.

A form of polymerized chloroprene suitable for the purposes of this invention is the synthetic rubber-like material formerly known commercially as "DuPrene" and now known as "Neoprene", and which may be made by polymerizing chloroprene in the manner set forth in United States Letters Patent No. 1,950,436, granted March 13, 1934, upon an application of Ira Williams. The chloroprene itself may be made in the manner described in United States Letters Patent No. 1,950,431, granted March 13, 1934, upon an application of W. H. Carothers and A. M. Collins. Malodorant-free polymerized chloroprene and a method of deodorizing plastic polymerized chloroprene are disclosed in United States Letters Patent No. 2,067,854, granted January 12, 1937, upon an application of A. D. Macdonald. While the invention is applicable to ordinary plastic polymerized chloroprene, certain of its advantages are especially apparent in the preparation of adhesives from deodorized or malodorant-free plastic polymerized chloroprene.

Having described my invention, what I claim as new and desire to secure by Letters Patent of the United States is:

1. The method of increasing the period of adhesiveness of a film of polymerized chloroprene to a similar film of polymerized chloroprene which comprises incorporating a small percentage of zinc chloride double salt of phenyl hydrazine in the polymerized chloroprene composition from which the film is produced.

2. An adhesive composition comprising plastic polymerized chloroprene dispersed in a solvent therefor, said composition being characterized by the presence of zinc chloride double salt of phenyl hydrazine therein and by the exhibition of tacky characteristics for a substantial period of time after application to a surface.

3. An adhesive composition comprising plastic polymerized chloroprene and compounding ingredients all dispersed in a volatile solvent therefor, said composition being characterized by the presence of the zinc chloride double salt or phenyl hydrazine in the proportion of about 1 to 5% by weight based upon the weight of the plastic polymer and by the exhibition of tacky characteristics within a short time after application to a surface and by the retention of such tacky characteristics for a considerable time thereafter.

4. An adhesive composition comprising malodorant-free plastic polymerized chloroprene and compounding ingredients all dispersed in a mixture of approximately equal volumes of benzene and trichloroethylene, and zinc chloride double salt of phenyl hydrazine in the proportion of about 1 to 5% by weight based on the amount of plastic polymer, said composition being characterized by the exhibition of tacky characteristics within a short time after application to a surface and by the retention of such tacky characteristics for at least an overnight period.

5. An adhesive composition comprising plastic polymerized chloroprene and compounding ingredients including zinc oxide dispersed in a volatile solvent therefor, said composition being characterized by the presence of zinc chloride double salt of phenyl hydrazine therein and by the exhibition of tacky characteristics within a a short time after application to a surface and by the retention of such tacky characteristics for a considerable time thereafter.

ALEXANDER D. MACDONALD.